United States Patent
Sato et al.

(10) Patent No.: US 10,935,956 B2
(45) Date of Patent: Mar. 2, 2021

(54) POSITIONING CONTROL DEVICE AND MOLD-CLAMPING APPARATUS

(71) Applicant: MURATA MACHINERY, LTD., Kyoto (JP)

(72) Inventors: Hajime Sato, Inuyama (JP); Atsuo Nagasawa, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 9 days.

(21) Appl. No.: 16/310,401

(22) PCT Filed: May 29, 2017

(86) PCT No.: PCT/JP2017/019903
§ 371 (c)(1),
(2) Date: Dec. 14, 2018

(87) PCT Pub. No.: WO2017/217222
PCT Pub. Date: Dec. 21, 2017

(65) Prior Publication Data
US 2019/0155247 A1 May 23, 2019

(30) Foreign Application Priority Data

Jun. 16, 2016 (JP) .............................. JP2016-120041

(51) Int. Cl.
*G05B 19/402* (2006.01)
*B30B 15/18* (2006.01)
(Continued)

(52) U.S. Cl.
CPC ........... *G05B 19/402* (2013.01); *B22D 17/26* (2013.01); *B29C 45/64* (2013.01); *B29C 45/80* (2013.01);
(Continued)

(58) Field of Classification Search
CPC .......... B22D 17/26; B29C 2945/76083; B29C 2945/76224; B29C 2945/76387;
(Continued)

(56) References Cited

U.S. PATENT DOCUMENTS 6,319,323 B1 * 11/2001 Gibson ................. B05C 5/0216
118/671
6,385,500 B1 * 5/2002 Hebbar .................. B23H 7/265
219/69.11
(Continued)

FOREIGN PATENT DOCUMENTS

JP H11-272335 A 10/1999
JP 2011205842 A 10/2011
(Continued)

OTHER PUBLICATIONS

Extended European Search Report for related EP App No. 17813124.9 dated Dec. 17, 2019, 8 pgs.
(Continued)

*Primary Examiner* — Chad G Erdman
(74) *Attorney, Agent, or Firm* — Procopio, Cory, Hargreaves & Savitch LLP

(57) ABSTRACT

A positioning control device mounted on an industrial machine including a driver including a motor, a movable body movable by the driver, a first detector that detects a position of the movable body based on the amount of driving of the driver, a servo amplifier that performs first feedback control of feedback-controlling driving of the motor based on a first detection value by the first detector, and a second detector that detects a position of the movable body when the movable body comes closer to a target position within a distance or shorter. The positioning control device is configured to position the movable body at the target position and includes a controller that controls the servo amplifier. The controller includes a switching unit that switches con-
(Continued)

trol modes between a first control mode performing the first feedback control and a second control mode disabling the first feedback control of the servo amplifier and performing second feedback control of feedback-controlling driving of the motor based on a second detection value by the second detector.

15 Claims, 13 Drawing Sheets

(51) Int. Cl.
*B29C 45/64* (2006.01)
*B22D 17/26* (2006.01)
*B29C 45/80* (2006.01)

(52) U.S. Cl.
CPC .... *B30B 15/18* (2013.01); *G05B 2219/42334* (2013.01); *G05B 2219/49135* (2013.01)

(58) Field of Classification Search
CPC ........... B29C 2945/76391; B29C 2945/76969; B29C 45/64; B29C 45/80; B30B 15/18; G05B 19/402; G05B 2219/42334; G05B 2219/49135
See application file for complete search history.

(56) References Cited

U.S. PATENT DOCUMENTS

| | | | |
|---|---|---|---|
| 2005/0218544 A1 | 10/2005 | Hakoda et al. | |
| 2006/0171264 A1* | 8/2006 | Zhou | G11B 7/08529 369/44.27 |
| 2015/0214904 A1 | 7/2015 | Lozhkin | |
| 2016/0185023 A1* | 6/2016 | Lee | B29C 45/64 700/200 |

FOREIGN PATENT DOCUMENTS

| | | |
|---|---|---|
| JP | 2014-121717 A | 7/2014 |
| JP | 2015-142325 A | 8/2015 |

OTHER PUBLICATIONS

International Search Report for related International Application No. PCT/JP2017/019903, dated Jun. 27, 2017; 1 page.

* cited by examiner (a)

(b)

POSITIONING CONTROL DEVICE AND MOLD-CLAMPING APPARATUS

CROSS-REFERENCE TO RELATED APPLICATIONS

This application is a U.S. National Stage entry of PCT Application No: PCT/JP2017/019903 filed May 29, 2017, which claims priority to Japanese Patent Application No. 2016-120041, filed Jun. 16, 2016, the contents of which are incorporated herein by reference.

TECHNICAL FIELD

The present invention relates to a positioning control device and a mold-clamping apparatus.

BACKGROUND ART

In the related art, in industrial machines in which a driver including a motor moves a movable body, a positioning control device positions the movable body at a target position. In the positioning control device, the position of the movable body is detected, and the detection value is input to a servo amplifier. The servo amplifier performs feedback control of the motor, based on the detection value for the position of the movable body. For example, Patent Literature 1 describes positioning control for mold positions in a mold-clamping apparatus as the technique related to such a positioning control device.

In the positioning control described in Patent Literature 1, when the movable mold (e.g., movable body) is at a distance from the fixed mold, first feedback control (e.g., semi-closed control) is performed by detecting the position of the movable mold with an encoder based on the number of revolutions of the motor and feedback-controlling the driving of the motor based on the detection value. On the other hand, when the movable mold is close to the fixed mold, in which case high accuracy in positioning the movable mold is required, second feedback control (e.g., full-closed control) is performed by detecting the position of the movable mold using a linear sensor and feedback-controlling the driving of the motor based on the detection value.

This technique of the present implementation eliminates the need for a linear sensor capable of detecting the position of the movable mold throughout the movable range. When the movable mold comes closer to the target position, the second feedback control is performed based on the detection value of the linear sensor to position the movable mold at the target position. The movable mold thus can be positioned at low cost and with high accuracy.

CITATION LIST

Patent Literature

[Patent Literature 1] Japanese Unexamined Patent Publication No. 2014-121717

SUMMARY OF INVENTION

Technical Problem

The related art technique described above requires a dedicated servo amplifier for switching from the first feedback control to the second feedback control. It may be difficult for widely distributed general-purpose related art servo amplifiers to handle this control.

Various aspects of the present invention are aimed to provide a positioning control device and a mold-clamping apparatus capable of positioning a movable body at low cost and with high accuracy, without depending on the servo amplifier.

Solution to Problem

A positioning control device according to an aspect of the present invention is mounted on an industrial machine including a driver including a motor, a movable body movable by the driver, a first detector configured to detect a position of the movable body, based on the amount of driving of the driver, a servo amplifier configured to perform first feedback control of feedback-controlling driving of the motor based on a first detection value by the first detector, and a second detector configured to detect a position of the movable body when the movable body comes closer to a target position within or less than a distance. The positioning control device is configured to position the movable body at the target position. The positioning control device includes a controller configured to control the servo amplifier. The controller includes a switching unit configured to switch control modes between a first control mode performing the first feedback control of the servo amplifier and a second control mode disabling the first feedback control of the servo amplifier and performing second feedback control of feedback-controlling driving of the motor based on a second detection value by the second detector.

In this positioning control device, when the movable body is farther from the target position than a distance, the control mode is switched to the first control mode by the switching unit in the controller, whereby the first feedback control of the servo amplifier is performed as it is. Then, when the movable body is close to the target position within or less than a distance, the control mode is switched to the second control mode by switching unit in the controller, whereby the second feedback control is performed rather than the first feedback control. The movable body is thus positioned at the target position.

Therefore, the movable body can be positioned at the target position under execution of the second feedback control having higher positioning accuracy than the first feedback control. There is no need performing the second feedback control throughout the movable range of the movable body, and a second detector that can detect the position of the movable body throughout the movable range becomes unnecessary. While the servo amplifier that performs first feedback control is used as it is, the controller has the function of switching between the first feedback control and the second feedback control. This configuration eliminates the need for a dedicated servo amplifier. The movable body thus can be positioned at low cost and with high accuracy without depending on the servo amplifier.

In the positioning control device according to an aspect of the present invention, a plurality of the servo amplifiers may be provided. The controller may centrally control the servo amplifiers. In this configuration, when a plurality of servo amplifiers is provided, the servo amplifiers can be controlled individually and in conjunction with each other by the controller.

In the positioning control device according to an aspect of the present invention, when the second detection value detected by the second detector is a position farther from the target position than a set distance, the switching unit may be set in a state in which the control mode is switched to the first control mode. When the second detection value detected by the second detector is positioned within or less than a set distance of the target position, the switching unit may be set in a state in which the control mode is switched to the second control mode. The control mode thus can be switched according to the second detection value.

In the positioning control device according to an aspect of the present invention, the controller may include a filter unit configured to filter off a high-frequency component of the second detection value to be fed back in the second feedback control. This configuration can prevent such control input that the second detection value abruptly changes during switching of the control mode to the second control mode by the switching unit and can prevent vibrating behavior of the movable body. Thus, the control mode can be switched by the switching unit even during moving of the movable body. This can reduce the necessity for stopping the movable body when the control mode is switched by the switching unit.

In the positioning control device according to an aspect of the present invention, the controller may include a command generating unit configured to generate a control command, may input, in a state in which the control mode is switched to the first control mode by the switching unit, the control command generated by the command generating unit to the servo amplifier, and may input, in a state in which the control mode is switched to the second control mode by the switching unit, the control command to which the first detection value is added and from which the second detection value is subtracted to the servo amplifier. In this case, when the control mode is switched to the first control mode, the first feedback control of the servo amplifier is performed as it is. When the control mode is switched to the second control mode, the first detection value to be fed back to the servo amplifier is cancelled to disable the first feedback control, and the second feedback control is performed. This configuration can specifically implement the positioning of the movable body without depending on the servo amplifier.

In the positioning control device according to an aspect of the present invention, in the second feedback control, driving of the motor may be feedback-controlled using the second detection value as a feedback component including a detection error relative to the first detection value. When the second detection value to be fed back in the second feedback control includes a detection error relative to the first detection value to be fed back in the first feedback control, the behavior of the movable body may become unstable during switching of the control mode by the switching unit. In order to prevent such unstable behavior during switching, the second detection value may be corrected. In this case, however, the control system may be complicated. On the other hand, although accurate positioning of the movable body at the target position is required in the positioning control device, unstable behavior of the movable body during switching often does not matter in actual situations. In an aspect of the present invention, the second detection value that includes a detection error relative to the first detection value is fed back as it is. This configuration can prevent complication of the control system by taking advantage of the actual situations. More specifically, when the controller includes a filter unit that filters off a high-frequency component of the second detection value to be fed back in the second feedback control, the filter unit can prevent the second detection value from abruptly changing during switching of the control mode while preventing complication of the control system.

A mold-clamping apparatus according to an aspect of the present invention includes a driver including a motor, a mold including a fixed mold and a movable mold serving as a movable body movable relative to the fixed mold by the driver, a first detector configured to detect a position of the movable body based on the amount of driving of the driver, a servo amplifier configured to perform first feedback control of feedback-controlling driving of the motor based on a detection value by the first detector, a second detector configured to measure a position of the movable mold when the movable mold comes closer to a target position within or less than a distance, and the positioning control device described above.

This mold-clamping apparatus includes the above-noted positioning control device and therefore achieves the same effect as the positioning control device, that is, the effect of positioning the movable mold at low cost and with high accuracy without depending on the servo amplifier.

Advantageous Effects of Invention

An aspect of the present invention provides a positioning control device and a mold-clamping apparatus capable of positioning a movable body at low cost and with high accuracy without depending on the servo amplifier.

DESCRIPTION OF EMBODIMENTS

Embodiments will be described in detail below with reference to the figures. In the figures, the same or corresponding parts are denoted by the same reference signs and an overlapping description thereof will not be repeated. The "direction Z" corresponds to the vertical direction. The direction X corresponds to a direction orthogonal to the direction Z. The direction Y corresponds to the direction orthogonal to the direction Z and the direction X. As used herein "upper" and "lower" correspond to "upper" and "lower", respectively, in the vertical direction.

First Embodiment

Figure 1:
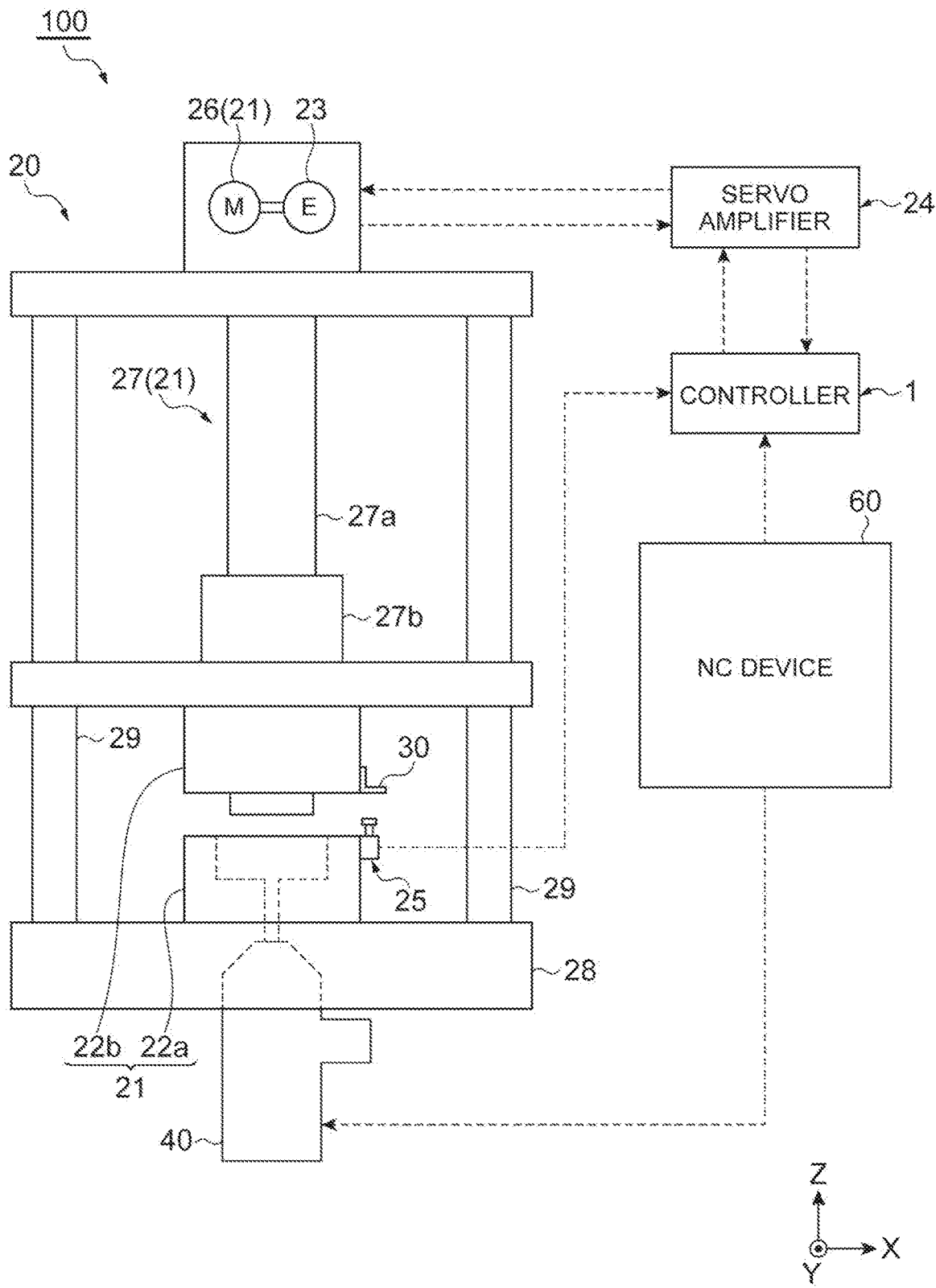
FIG. 1 is a schematic front view of an injection molding machine including a mold-clamping apparatus equipped with a positioning control device according to a first embodiment.

An injection molding machine 100 illustrated in FIG. 1 is an apparatus that manufactures molded products by injection-molding a material such as resin. The injection molding machine 100 is applied, for example, for manufacturing light-guide plates of mobile terminals. The injection molding machine 100 includes a mold-clamping apparatus 20, an injection apparatus 40, and a numerical control (NC) device 60.

The mold-clamping apparatus 20 includes a driver 21, a mold 22, an encoder (e.g., first detector) 23, a servo amplifier 24, a linear sensor (e.g., second detector) 25, and a positioning control device 10. The mold-clamping apparatus 20 is an industrial machine for opening/closing and clamping the mold 22.

The driver 21 supplies driving force for opening/closing and clamping the mold 22. The driver 21 includes a motor 26 and a ball screw 27 coupled to the motor 26. The motor 26 drives the ball screw 27. The ball screw 27 includes a threaded shaft 27a having its axial direction in the direction Z, and a slider 27b including a ball screw nut linearly movable along the threaded shaft 27a in the direction Z. The motor 26 and the ball screw 27 are not limited to particular types and a variety of motors and ball screws can be used. In the driver 21, the ball screw 27 may be directly coupled to the motor 26, or a mechanism such as a gear may be interposed therebetween.

The mold 22 is a mold for shaping a material. The mold 22 includes a fixed mold 22a and a movable mold (e.g., movable body) 22b. The fixed mold 22a and the movable mold 22b are disposed to face each other in the direction Z. A hollow portion to be filled with a material is formed between the fixed mold 22a and the movable mold 22b.

The fixed mold 22a is fixed to a stage 28. The movable mold 22b can be moved relative to the fixed mold 22a by the driver 21 in the direction Z. More specifically, the movable mold 22b is supported so as to be movable in the direction Z through ram shafts 29 and is coupled to the slider 27b of the ball screw 27. In the illustrated example, the fixed mold 22a is a lower mold and corresponds to a cavity. The movable mold 22b is an upper mold and corresponds to a core.

The encoder 23 detects the position of the movable mold 22b based on the amount of driving of the motor 26. The encoder 23 is attached to the rotation axis of the motor 26. The encoder 23 detects the position in the direction Z of the movable mold 22b, based on at least one of the number of revolutions per unit time, the rotation angle, and the rotation position of the motor 26. The encoder 23 outputs a detection value (hereinafter referred to as "first detection value") for the position in the direction Z of the movable mold 22b to the servo amplifier 24. The encoder 23 also outputs the first detection value to the controller 1. The first detection value is, for example, a pulse signal. The encoder 23 does not directly detect the position of the movable mold 22b but detects the amount of driving of the motor 26. Therefore, the encoder 23 may easily produce a detection error compared with the linear sensor 25, due to error factors (for example, thermal expansion or slip of the driver 21 or the mold 22) present between the motor 26 and the movable mold 22b.

Figure 2:
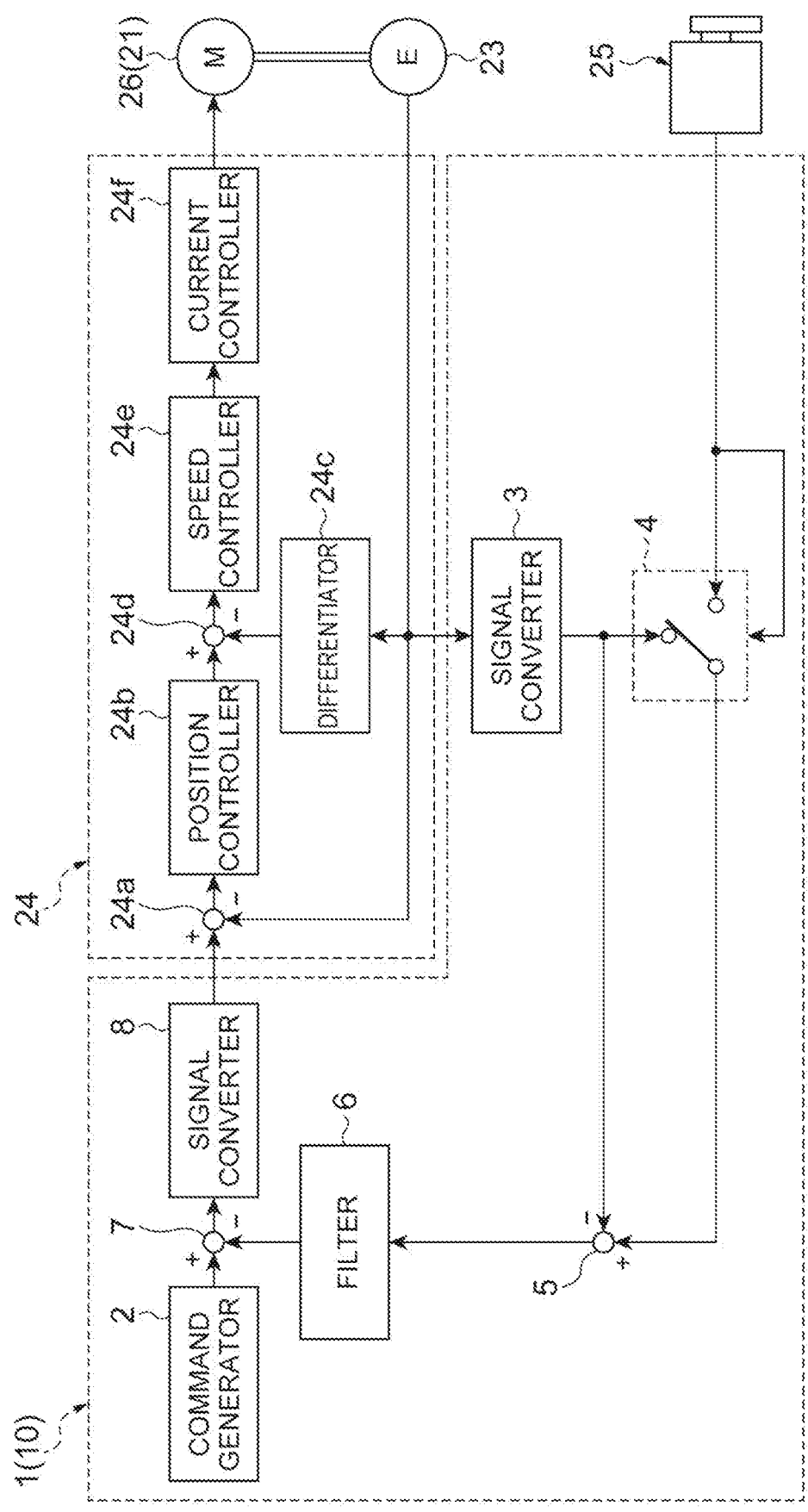
FIG. 2 is a block diagram of a controller and a servo amplifier in a first control mode.
Figure 3:
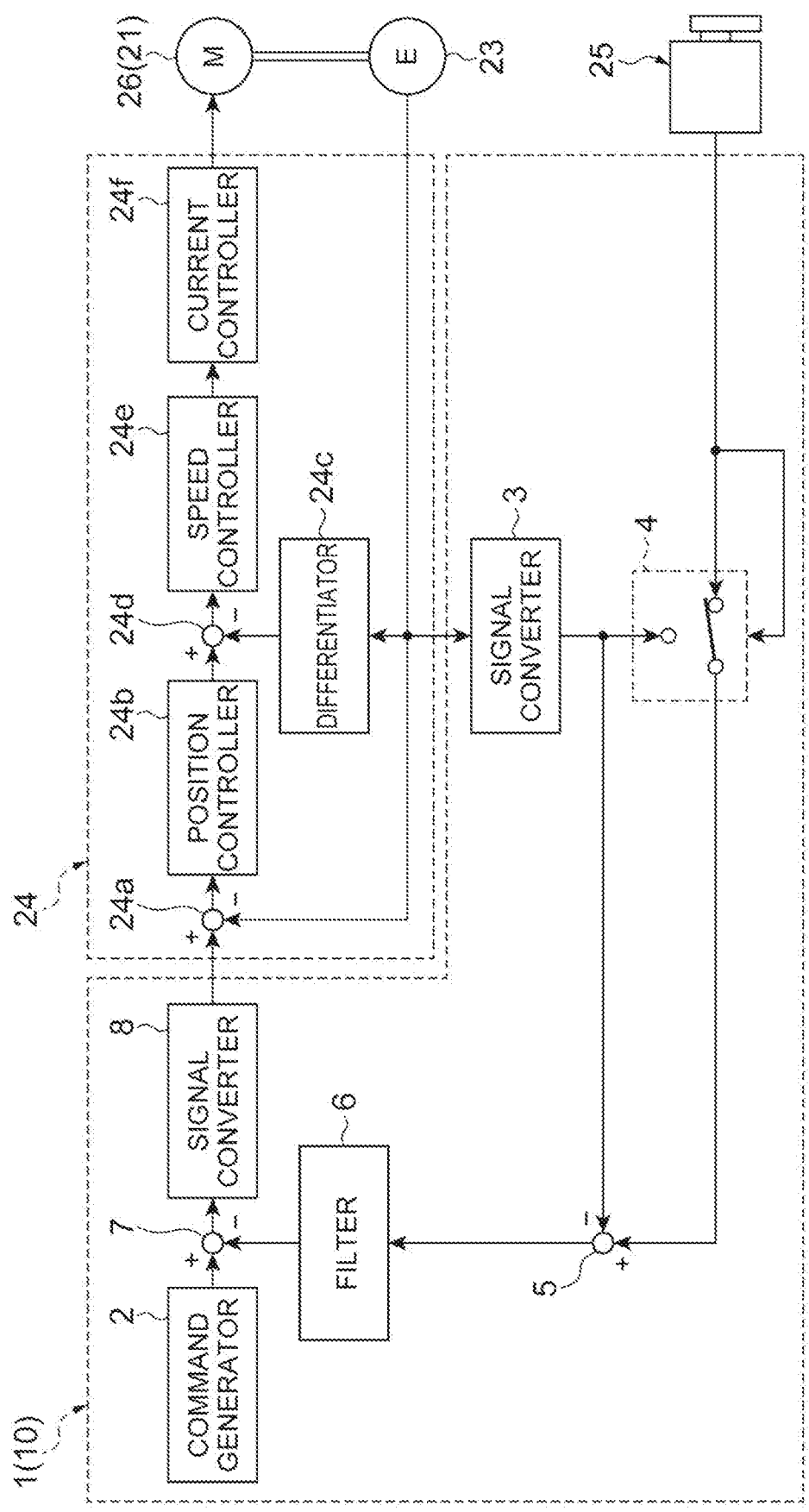
FIG. 3 is a block diagram of the controller and the servo amplifier in a second control mode.

The servo amplifier 24 performs first feedback control of feedback-controlling the driving of the motor 26 based on the first detection value of the encoder 23. In the first feedback control, the driving of the motor 26 is controlled in response to a position command (e.g., control command) input from the controller 1 as described herein, and the first detection value of the encoder 23 is fed back as a feedback component to the position command. As illustrated in FIG. 2 and FIG. 3, the servo amplifier 24 includes a difference calculator 24a, a position controller 24b, a differentiator 24c, a difference calculator 24d, a speed controller 24e, and a current controller 24f.

The difference calculator 24a subtracts the first detection value of the encoder 23 from the position command input by the controller 1. The position command is input to the positive input of the difference calculator 24a. The first detection value is input to the negative input of the difference calculator 24a. The difference calculator 24a outputs a deviation between the position command and the first detection value as a position deviation to the position controller 24b. The position controller 24b multiplies the position deviation input from the difference calculator 24a by a control gain and outputs the result as a speed command for the movable mold 22b to the positive input of the difference calculator 24d.

The differentiator 24c differentiates the first detection value of the encoder 23 with respect to time to generate a speed signal for the amount of change per unit time of the first detection value of the encoder 23, that is, the speed of the movable mold 22b. The differentiator 24c outputs the speed signal to the negative input of the difference calculator 24d. The difference calculator 24d subtracts the speed signal input from the differentiator 24c from the speed command input by the position controller 24b. The difference calculator 24d outputs a deviation between the speed command and the speed signal as a speed deviation to the speed controller 24e.

The speed controller 24e multiplies the speed deviation input from the difference calculator 24d by a control gain and outputs the result as a current command for the current value to be applied to the motor 16 to the current controller 24f. The current controller 24f controls the driving current of the motor 16, based on the current command input from the speed controller 24e.

Figure 4:
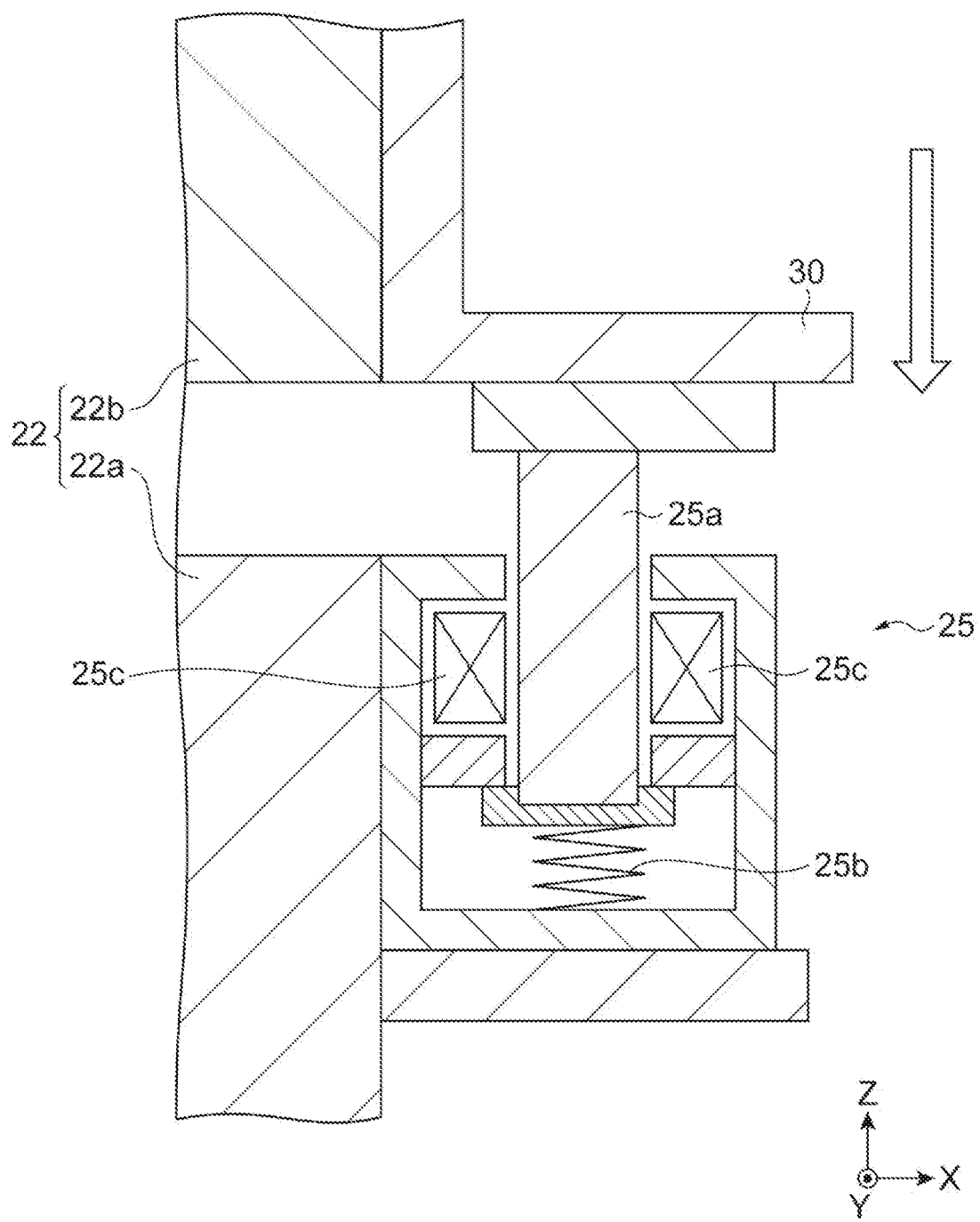
FIG. 4 is a cross-sectional view of a linear sensor of the mold-clamping apparatus illustrated in FIG. 1.

The linear sensor 25 is a sensor that measures the position of the movable mold 22b when the movable mold 22b comes closer to the fixed mold 22a. As illustrated in FIG. 4, the linear sensor 25 is fixed to the upper portion of the fixed mold 22a. The linear sensor 25 is disposed to face a reference plate 30 fixed to the lower portion of the movable mold 22b. The reference plate 30 may optionally be omitted and the linear sensor 25 may be disposed to face part of the movable mold 22b.

In the linear sensor 25, when the movable mold 22b lowers and comes closer to the fixed mold 22a, the upper surface of the magnetic rod 25a comes into contact with the reference plate 30, and the magnetic rod 25a is pushed in by the reference plate 30. The magnetic rod 25a is biased by a spring 25b and thus lowered integrally with the reference plate 30. In this case, the phase of a magnetic mark on the magnetic rod 25a is read by the sensor head 25c, so that the position in the direction Z of the reference plate 30, that is, the position in the direction Z of the movable mold 22b relative to the fixed mold 22a is detected. Thus, in the linear sensor 25, the actual distance between the fixed mold 22a and the movable mold 22b is measured within a range of stroke of the magnetic rod 25a, and the position in the direction Z of the movable mold 22b is measured.

In this manner, the linear sensor 25 measures the position in the direction Z of the movable mold 22b when the movable mold 22b comes closer to the fixed mold 22a until the reference plate 30 and the magnetic rod 25a abut against each other, that is, when the movable mold 22b comes close within a distance from the target position to be positioned by the positioning control device 10. The linear sensor 25 outputs the detection value (hereinafter referred to as "second detection value") for the position in the direction Z of the movable mold 22b to the positioning control device 10.

A distance is the distance of the movable mold 22b from the target position when the linear sensor 25 starts detecting the second detection value. As used herein a distance is the distance between the movable mold 22b and the target position when the magnetic rod 25a of the linear sensor 25 starts abutting against the reference plate 30. The distance is not limited to a particular value and can be adjusted, for example, by changing the fixed position of the reference plate 30 and the linear sensor 25 as appropriate. The distance corresponds to a proximate section in which the movable mold 22b is close to the target position. The distance is shorter than a movable distance in which the movable mold 22b can be relatively moved by the driver 21. The linear sensor 25 is not limited to particular sensors and a variety of known linear sensors can be used.

As illustrated in FIG. 1 and FIG. 2, the positioning control device 10 is a control device that positions the movable mold 22b at a target position. The positioning control device 10 implements positioning of the movable mold 22b with accuracy on the order of μm. The target position refers to the position of the movable mold 22b, when the mold 22 is in a closed state in the positioning control device 10 mounted on the mold-clamping apparatus 20. The positioning control device 10 includes a controller 1 for controlling the servo amplifier 24. The details of the controller 1 will be described herein.

The injection apparatus 40 is an apparatus for injecting a material into the mold 22 (e.g., between the fixed mold 22a and the movable mold 22b). The injection apparatus 40 includes, for example, a nozzle, an injection cylinder, and a hopper. The injection apparatus 40 is coupled so as to inject a material into the mold 22. The injection apparatus 40 is not limited to particular injectors, and a variety of known apparatuses such as inline screw injectors can be employed.

The NC device 60 controls the injection molding machine 100 as a whole including the mold-clamping apparatus 20 and the injection apparatus 40. The NC device 60 controls the molding conditions such as injection speed, pressure, and temperature. More specifically, the NC device 60 outputs to specify the control conditions (for example, a target position for positioning) for the positioning control device 10 to the controller 1 of the positioning control device 10. The NC device 60 includes an operation unit such as a touch panel. The operator operates the operation unit in the NC device 60 to set a variety of molding conditions.

The controller 1 in the positioning control device 10 will now be described more specifically.

As illustrated in FIG. 1 to FIG. 3, the controller 1 configures the host control system for the servo amplifier 24. The controller 1 is configured separately from the servo amplifier 24. The controller 1 controls the servo amplifier 24 to selectively perform the first feedback control and the second feedback control of feedback-controlling the driving of the motor 26 based on the second detection value of the linear sensor 25.

The first feedback control has the merit of increasing the control gain because of a small delay. The first feedback control may also be referred to as semi-closed control. The second feedback control has the merits of being robust, being capable of position control even when thermal expansion or slip of the driver 21 or the mold 22 occurs, and having higher positioning accuracy compared with the first feedback control. The second feedback control may also be referred to as full-closed control.

The controller 1 includes a command generator (e.g., command generating unit) 2, a signal converter 3, a switch (e.g., switching unit) 4, a difference calculator 5, a filter (e.g., filter unit) 6, a difference calculator 7, and a signal converter 8 as a circuit configuration.

The command generator 2 generates a position command for the movable mold 22b in accordance with the operation pattern corresponding to the control conditions input from the NC device 60. The command generator 2 outputs the generated position command to the positive input of the difference calculator 7.

The signal converter 3 refers to information of the moving distance corresponding to a unit pulse and converts the signal format of the first detection value detected by the encoder 23 from a pulse signal into an analog signal. The signal converter 3 outputs the converted first detection value to the negative input of difference calculator 5 and to the switch 4. The information of the moving distance corresponding to a unit pulse is stored in the controller 1 in advance. In the servo amplifier 24, the first detection value to be fed back to the difference calculator 24a from the encoder 23 is input to the signal converter 3. However, the first detection value may be directly input from the encoder 23 to the signal converter 3.

The switch 4 switches the input to the positive input of the difference calculator 5 between the first detection value input from the signal converter 3 and the second detection value input from the linear sensor 25. The switch 4 thus switches control modes between a first control mode performing the first feedback control and a second control mode disabling the first feedback control and performing the second feedback control (the detail will be described herein). As used herein "disabling" includes not only completely disabling the first feedback control, but also disabling at least part of the frequency region in the first feedback control.

The switch 4 switches its switch state in accordance with the second detection value of the linear sensor 25. More specifically, when the second detection value is not detected in the linear sensor 25 and the second detection value is not input to the switch 4, the switch 4 sets the control mode switched to the first control mode in which input to the positive input of the difference calculator 5 is the first detection value. In other words, when the second detection value is zero, that is, when the second detection value is a position from the target position farther than the set distance (e.g., the distance described above), the switch 4 sets the control mode switched to the first control mode. On the other hand, when the second detection value is detected in the linear sensor 25 and the second detection value is input to the switch 4, the switch 4 sets the control mode switched to the second control mode in which input to the positive input of the difference calculator 5 is the second detection value. In other words, when the second detection value is greater than zero, that is, a position close to the target position within or less than the set distance (e.g., the distance described above), the switch 4 sets the control mode in a state switched to the first control mode.

The switching timing of the switch 4 is a timing when a switch instruction unit (not illustrated) inside the controller 1 transmits a switch command to the switch 4. That is, the switch 4 switches the control mode to the second control mode at a timing of receiving a switch command from the above-noted switch command unit, on condition that the second detection value is input to the switch 4. The switch 4 switches the control mode to the first control mode at a timing of receiving a switch command from the above-noted switch command unit, on condition that the second detection value is not input to the switch 4. The switch 4 can be configured with a soft switch, a known circuit element, or the like.

When the switch 4 is switched such that the first detection value is input to the positive input of the difference calculator 5, the difference calculator 5 obtains a detection value deviation by subtracting the first detection value input not through the switch 4 from the first detection value input through the switch 4. In this case, the detection value deviation is a deviation obtained by subtracting the first detection value from the first detection value, that is, zero. The difference calculator 5 outputs the value zero as a detection value deviation to the filter 6. On the other hand, when the switch 4 is switched such that the second detection value is input to the positive input of the difference calculator 5, the difference calculator 5 obtains a detection value deviation by subtracting the first detection value input not through the switch 4 from the second detection value input through the switch 4. In this case, the detection value deviation is a deviation obtained by subtracting the first detection value from the second detection value. The difference calculator 5 outputs the detection value deviation to the filter 6.

The filter 6 filters off a high-frequency component in the detection value deviation input from the difference calculator 5. More specifically, the filter 6 filters off a high-frequency component in each of the first detection value and the second detection value that form the detection value deviation input from the difference calculator 5, in a state in which the switch 4 is switched such that the second detection value is input to the positive input of the difference calculator 5 (e.g., see FIG. 3). The filter 6 is a low-pass filter which allows a frequency component lower than a reference to pass through and cuts off a high frequency component. In the filter 6, filtering by a first-order lag system, filtering by a second-order lag system, and filtering by moving averages are performed.

The filter 6 is a digital filter that applies mathematical processing on input data. For example, a microprocessor is used as the filter 6. The filter 6 implements filtering by a program (e.g., non-transitory computer-readable medium including machine-executable instructions for at least the filtering operation). The filter 6 outputs the detection value deviation subjected to filtering to the negative input of the difference calculator 7. The filter 6 may be configured with an electric circuit or an electronic circuit.

The difference calculator 7 subtracts the detection value deviation input from the filter 6 from the position command input from the command generator 2. The difference calculator 7 outputs the position command obtained by subtracting the detection value deviation to the signal converter 8.

The signal converter 8 refers to information of the moving distance corresponding to a unit pulse to convert the signal format of the position command input from the difference calculator 7 from an analog signal into a pulse signal. The signal converter 8 outputs the converted position command to the difference calculator 24a of the servo amplifier 24.

An example of the processing performed by the positioning control device 10 will now be described. In the following description, the movable mold 22b is positioned by the positioning control device 10 in clamping in the mold-clamping apparatus 20 of the injection molding machine 100, as an example.

In the mold 22 in an open state, the movable mold 22b is at a distance from the fixed mold 22a, the linear sensor 25 is not in contact with the reference plate 30, and the movable mold 22b is positioned farther than a distance above the target position (e.g., the position of the movable mold 22b when the mold 22 is in a closed state). In this state, in the positioning control device 10, under the control conditions input by the NC device 60, the controller 1 controls the servo amplifier 24, and the motor 26 is driven to actuate the ball screw 27 to lower the movable mold 22b.

Figure 5:
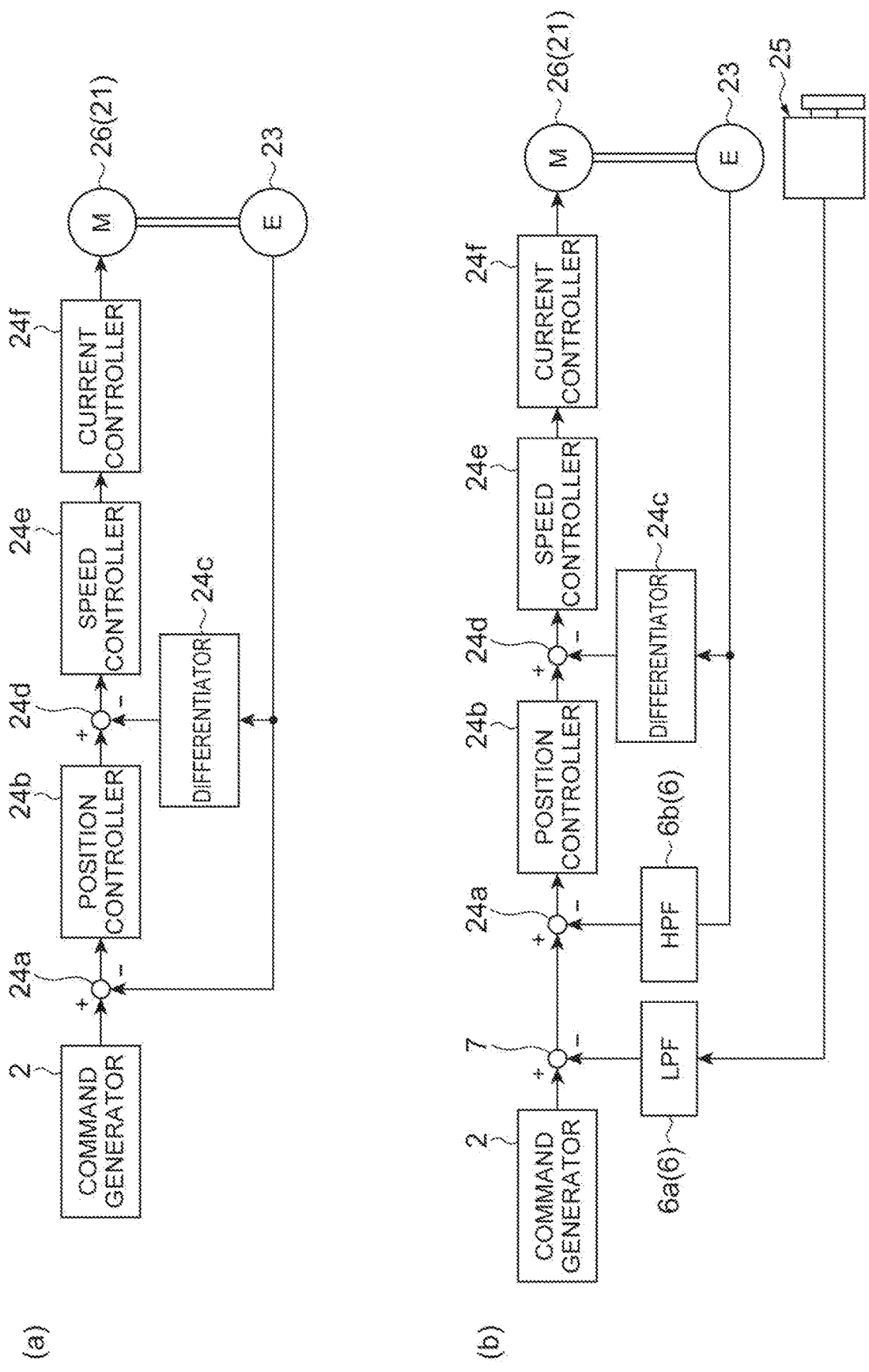
FIG. 5(a) is a principle block diagram in the first control mode.
FIG. 5(b) is a principle block diagram in the second control mode.

Here, before the movable mold 22b comes closer to the fixed mold 22a and the linear sensor 25 comes into contact with the reference plate 30, the linear sensor 25 has not yet detected the second detection value and the second detection value has not been input to the switch 4. Therefore, as illustrated in FIG. 2, the switch 4 is in a switched state such that the first detection value is input to the positive input of the difference calculator 5. In this case, the first detection value is cancelled out by the difference calculator 5, the value zero is input to the difference calculator 7 through the filter 6, and the position command from the command generator 2 is input as it is to the servo amplifier 24 through the signal converter 8. As a result, the principle block diagram illustrated in FIG. 5(a) is substantially configured, and the first feedback control of the servo amplifier 24 is performed as it is. That is, the switch 4 is set in a state in which the control mode is switched to the first control mode performing the first feedback control of the servo amplifier 24.

Subsequently, the movable mold 22b is lowered, and after the movable mold 22b comes closer to the fixed mold 22a and the linear sensor 25 comes into contact with the reference plate 30, the second detection value is detected by the linear sensor 25, and the second detection value is input to the switch 4. Thus, as illustrated in FIG. 3, the switch 4 is in a switched state such that the second detection value is input to the positive input of the difference calculator 5. In this case, the detection value deviation obtained by subtracting the first detection value from the second detection value in the difference calculator 5 is input to the negative input of the difference calculator 7 through the filter 6. The position command obtained by subtracting the detection value deviation is input to the servo amplifier 24 through the signal converter 8. That is, the first detection value is substantially added to (in other words, the subtracted first detection value is subtracted from) and the second detection value is subtracted from the position command to be input to the servo amplifier 24.

Thus, in the servo amplifier 24, the first detection value fed back to the servo amplifier 24 is cancelled out by the first detection value added to the position command, whereby the first feedback control is disabled. In addition, the second detection value is fed back to the position command. As a result, the principle block diagram illustrated in FIG. 5(b) is substantially configured, and the second feedback control is performed. That is, the switch 4 is set in a state in which the control mode is switched to the second control mode disabling the first feedback control of the servo amplifier 24 and performing the second feedback control.

Figure 6:
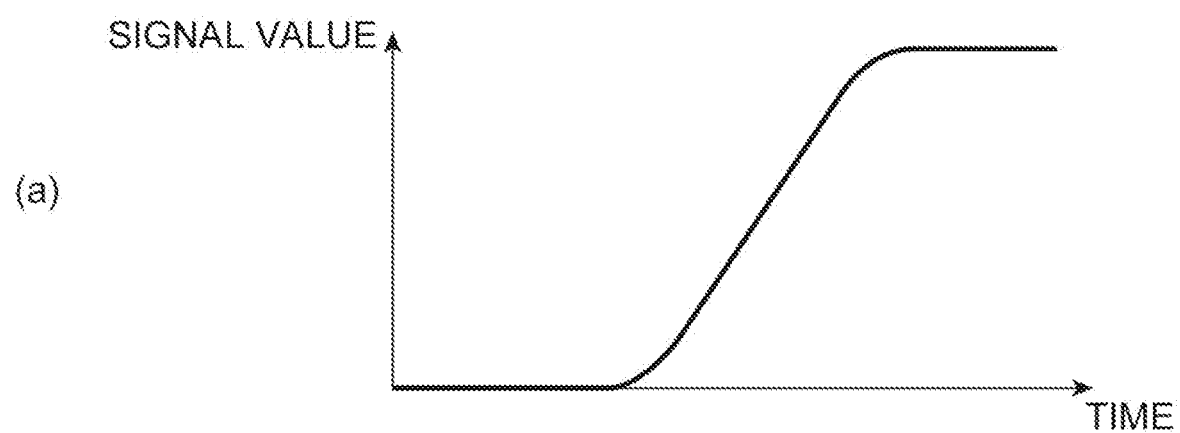
FIG. 6(a) is a graph illustrating temporal change of the second detection value to be fed back, which has not been filtered by the filter illustrated in FIG. 2, and FIG. 6(b) a graph illustrating temporal change of the second detection value to be fed back, which has been filtered by the filter illustrated in FIG. 2.
Figure 6:
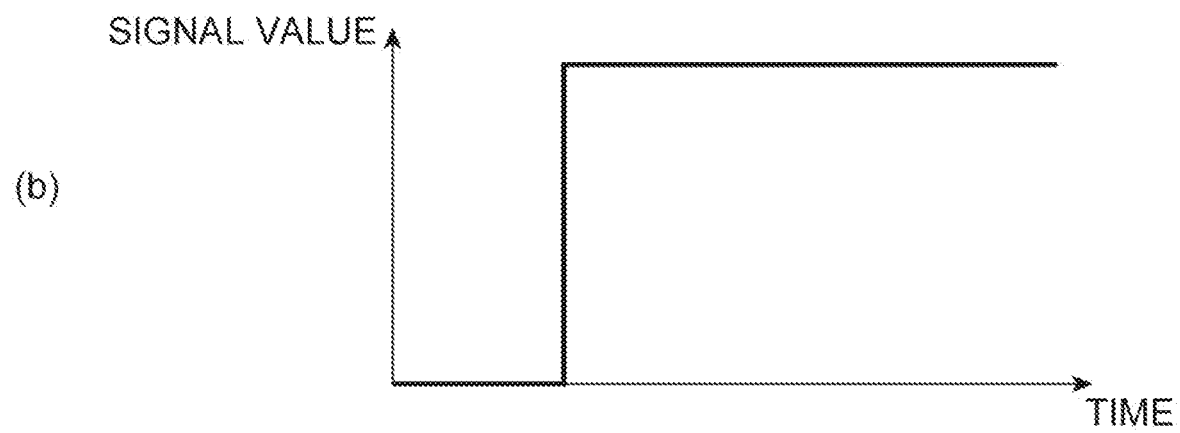

In the second control mode, the high-frequency component of the second detection value to be fed back in the second feedback control (e.g., the second detection value input to the negative input of the difference calculator 7) is filtered off by the filter 6 serving as the low-pass filter 6a, as illustrated by the principle block diagram in the figure. Thus, during switching to the second control mode by the switch 4, the second detection value to be fed back is control input as a signal value gradually rising (e.g., see FIG. 6(*a*)). In other words, the control input of the second detection value steeply rising (e.g., see FIG. 6(*b*)) is prevented.

In the second control mode, the high-frequency component of the first detection value substantially added to the position command (e.g., the first detection value input to the negative input of the difference calculator 7) is filtered off by the filter 6. Thus, the low-frequency component of the first detection value to be fed back to the servo amplifier 24 is cancelled out and, as a result, the high-frequency component of the first detection value is fed back to the position command from the encoder 23. That is, as illustrated in the principle block diagram in the figure, the high-frequency component of the first detection value is fed back to the position command from the encoder 23 by the filter 6 serving as the high-pass filter 6b. This processing enhances the stability of control.

As described above, in the positioning control device 10, when the movable mold 22b is not close to the fixed mold 22a and the movable mold 22b is farther from the target position than a distance, the control mode is switched to the first control mode by the switch 4 in the controller 1. Thus, the first feedback control of the servo amplifier 24 is performed as it is. When the movable mold 22b comes closer to the fixed mold 22a and the movable mold 22b comes closer to the target position within or less than a distance, the control mode is switched to the second control mode by the switch 4 in the controller 1. Thus, the second feedback control is performed, rather than the first feedback control, whereby the movable mold 22b is positioned at the target position.

Therefore, the positioning control device 10 allows the movable mold 22b to be positioned at the target position under execution of the second feedback control having positioning accuracy higher than the first feedback control. There is no need performing the second feedback control throughout the movable range of the movable mold 22b, and there is no need for using a sensor capable of detecting the position of the movable mold 22b throughout the movable range as the linear sensor 25. While the servo amplifier 24 that performs the first feedback control is used as it is, the controller 1 has the function of switching between the first feedback control and the second feedback control. Therefore, the control can be handled by a general-purpose servo amplifier 24 and a dedicated servo amplifier is unnecessary. As described above, the movable mold 22b can be positioned at low cost and with high accuracy without depending on the servo amplifier 24. Furthermore, the positioning control device 10 can be added to an existing mold-clamping apparatus. In this case, the add-on positioning control device 10 enables positioning of the movable mold 22b at low cost and with high accuracy.

In the positioning control device 10, when the second detection value is not detected in the linear sensor 25, the switch 4 is set in a state in which the control mode is switched to the first control mode. When the second detection value is detected in the linear sensor 25, the switch 4 is set in a state in which the control mode is switched to the second control mode. Thus, the control mode can be switched according to the second detection value.

In the positioning control device 10, the controller 1 includes the filter 6 that filters off a high-frequency component of the second detection value to be fed back in the second feedback control. Thus, during switching of the control mode to the second control mode by the switch 4, the abrupt changing of the control input of the second detection value can be prevented. The vibrating behavior of the movable mold 22b during the switching can be prevented. Even when the movable mold 22b moves at a constant speed or while accelerating or decelerating, the control mode can be switched smoothly by the switch 4. This can reduce the necessity for stopping the movable mold 22b in switching of the control mode by the switch 4.

In the positioning control device 10, the controller 1 includes the command generator 2 that generates a position command. The controller 1 inputs, in a state in which the control mode is switched to the first control mode by the switch 4, the position command generated by the command generator 2 to the servo amplifier 24 (e.g., see FIG. 2). Thus, the first feedback control of the servo amplifier 24 is performed as it is. The controller 1 inputs, in a state in which the control mode is switched to the second control mode by the switch 4, the control command to which the first detection value is added and from which the second detection value is subtracted to the servo amplifier 24 (e.g., see FIG. 3). Thus, the first detection value to be fed back to the servo amplifier 24 is cancelled to disable the first feedback control, and the second feedback control is performed. Therefore, the positioning of the movable mold 22b without depending on the servo amplifier 24 can be specifically implemented.

Figure 7:
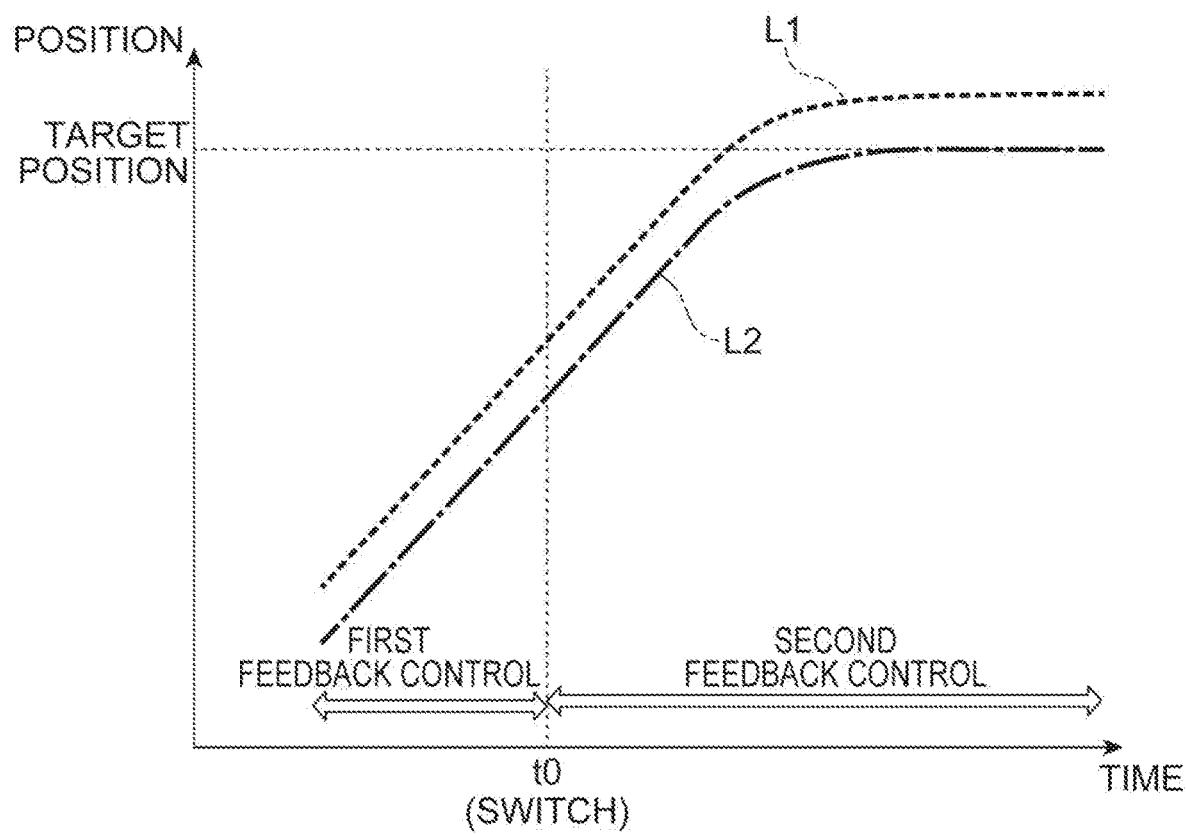
FIG. 7 is a graph illustrating an example of temporal change of the first detection value and the second detection value.

FIG. 7 is a graph illustrating an example of temporal changes of the first detection value D1 and the second detection value D2 in clamping of the mold-clamping apparatus 20. The vertical axis represents the position of the movable mold 22b and the horizontal axis represents time. In an example in the figure, at time t0, the control mode is switched by the switch 4, and the feedback control to be performed is switched from the first feedback control to the second feedback control.

At the same detection timing, if the second detection value includes a detection error relative to the first detection value, the feedback component suddenly changes during switching of the control mode by the switch 4. This may make the behavior of the movable mold 22b unstable. In order to prevent such unstable behavior during switching, the second detection value may be corrected. In this case, however, the control system may be complicated. On the other hand, although accurate positioning of the movable mold 22b at the target position is required in the positioning control device 10, the unstable behavior of the movable mold 22b during the switching often does not matter in actual situations. In this respect, as illustrated in FIG. 7, the second detection value D2 has a detection error relative to the first detection value D1. In the second feedback control of the positioning control device 10, the second detection value D2 that includes a detection error relative to the first detection value D1 is fed back as it is. This configuration can prevent complication of the control system by taking advantage of such actual situations.

The mold-clamping apparatus 20 and the injection molding machine 100 include the positioning control device 10 and therefore can achieve the effect of positioning the movable mold 22b at low cost and with high accuracy without depending on the servo amplifier 24, in the same manner as the positioning control device 10.

In the positioning control device 10, the filter 6 of the controller 1 filters not only the second detection value to be fed back in the second feedback control but also the first detection value to be substantially added to the position command. Thus, as illustrated in FIG. 5(b), the function as the high-pass filter 6b and the function as the low-pass filter 6a can be implemented by a single filter 6. In the present embodiment, the positioning control device 10 positions the movable mold 22b in clamping of the mold-clamping apparatus 20. However, the positioning control device 10 may position the movable mold 22b in mold opening by the mold-clamping apparatus 20, as a matter of course.

Second Embodiment

A second embodiment will now be described. In the description of the present embodiment, differences from the first embodiment will be described and an overlapping description will be omitted.

Figure 8:
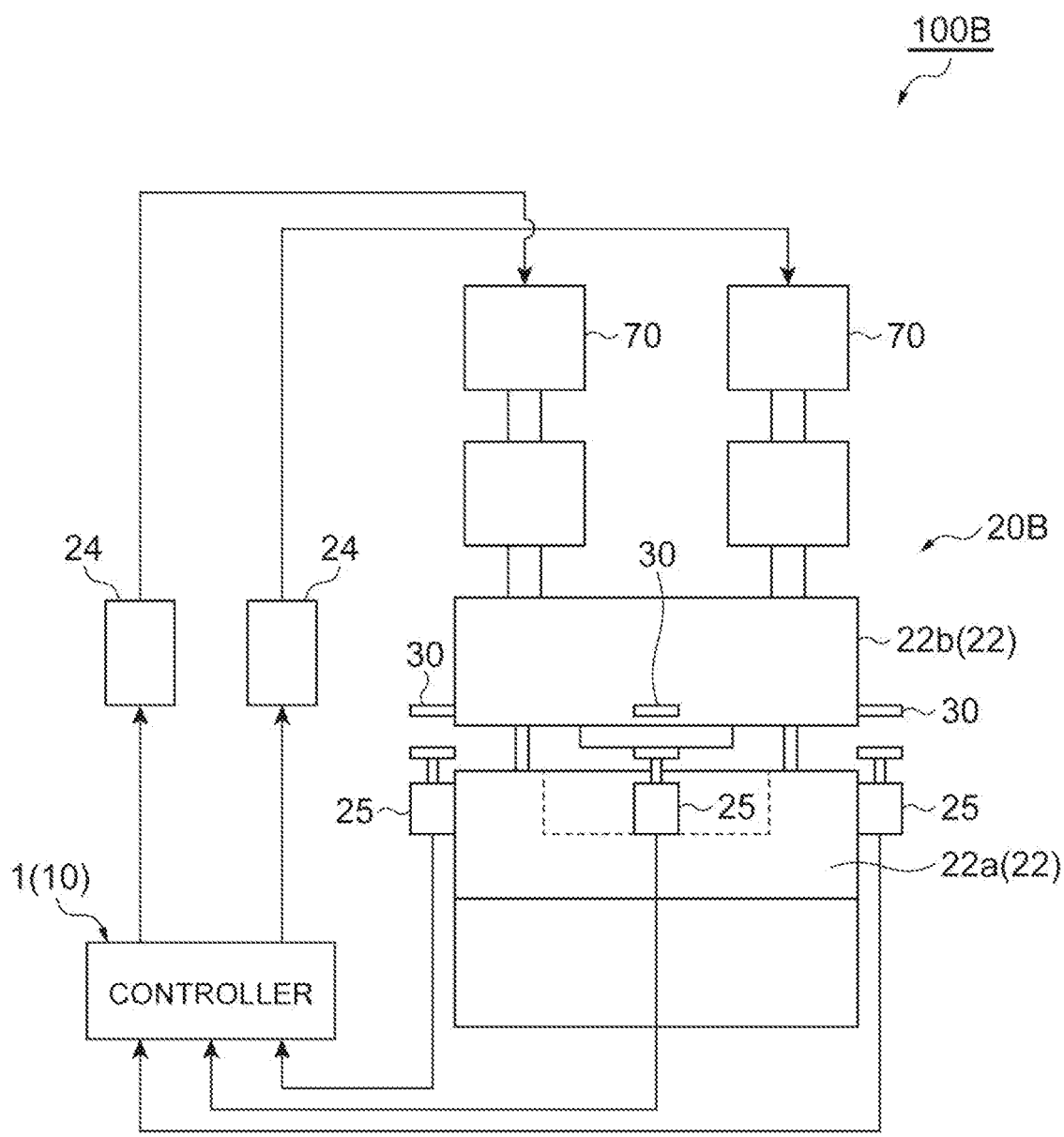
FIG. 8 is a schematic front view of an injection molding machine including a mold-clamping apparatus equipped with a positioning control device according to a second embodiment.

As illustrated in FIG. 8, the positioning control device 10 of the present embodiment is mounted on a mold-clamping apparatus 20B of an injection molding machine 100B. The injection molding machine 100B is configured in the same manner as the injection molding machine 100 except that it includes a mold-clamping apparatus 20B. The mold-clamping apparatus 20B is configured in the same manner as the mold-clamping apparatus 20 described above except that it includes a plurality of drivers 70, a plurality of servo amplifiers 24, and a plurality of linear sensor 25. The driver 70 is a ram shaft including a motor and a hydraulic cylinder. In the illustrated example, two drivers 70 are provided, two servo amplifiers 24 are provided, and three linear sensors 25 are provided. The servo amplifier 24 controls the motor that drives the hydraulic cylinder.

The controller 1 of the positioning control device 10 controls two servo amplifier 24. The controller 1 controls two servo amplifiers 24 individually or in conjunction with each other. The controller 1 allows the switch 4 (e.g., see FIG. 2) to switch between a first control mode performing first feedback control of two servo amplifiers 24 and a second control mode disabling the first feedback control and performing second feedback control based on the second detection values of three linear sensors 25.

The positioning control device 10 of the present embodiment also achieves similar effects as in the foregoing first embodiment. In the positioning control device 10, the controller 1 centrally controls a plurality of servo amplifiers 24. Thus, even when a plurality of servo amplifiers 24 are provided, these servo amplifiers 24 can be controlled by the controller 1 individually and in conjunction with each other. In addition to the positioning of the movable mold 22b, the posture such as inclination of the movable mold 22b can be controlled.

Third Embodiment

A third embodiment will now be described. In the description of the present embodiment, differences from the first embodiment will be described and an overlapping description will be omitted.

Figure 9:
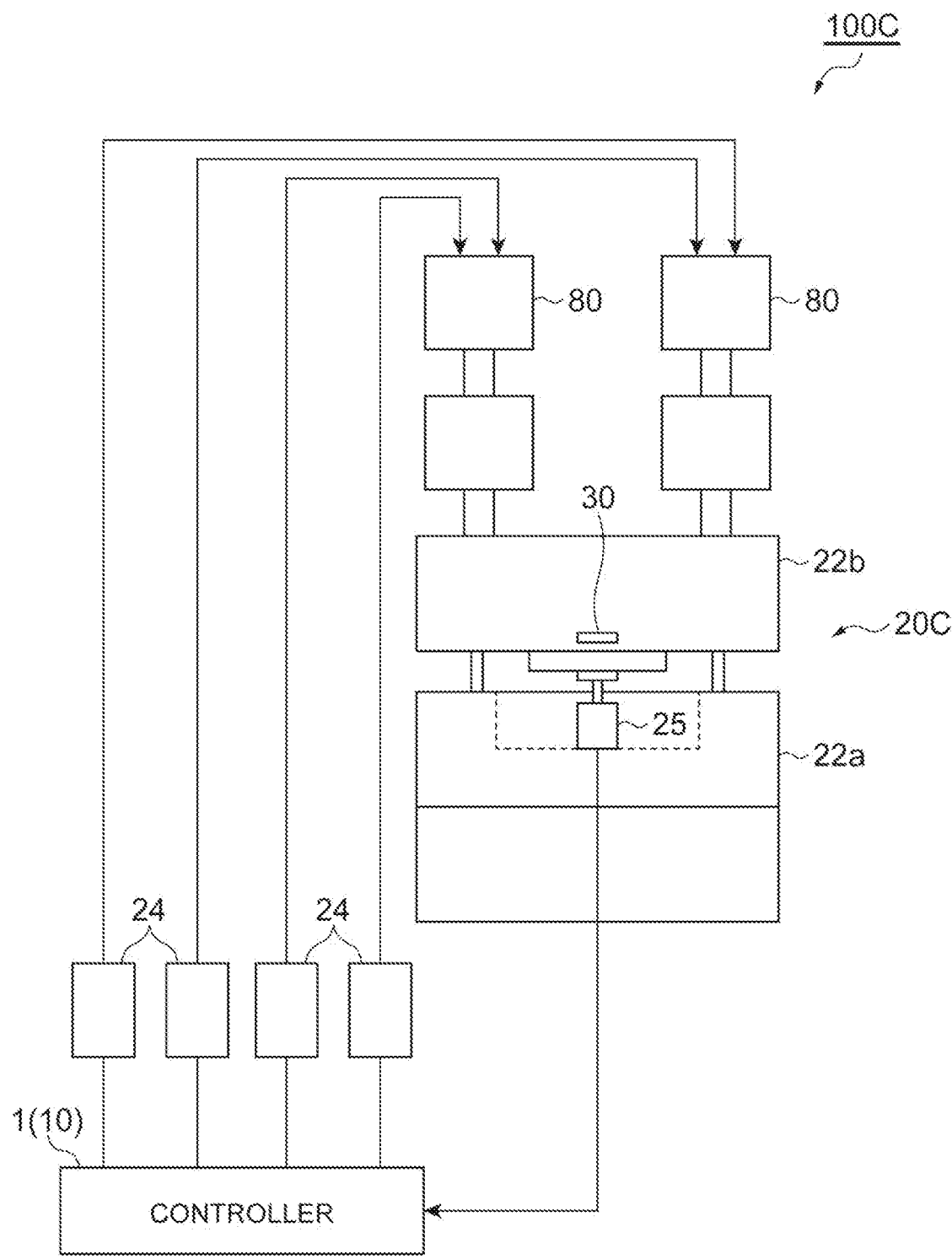
FIG. 9 is a schematic front view of an injection molding machine including a mold-clamping apparatus equipped with a positioning control device according to a third embodiment.

As illustrated in FIG. 9, the positioning control device 10 of the present embodiment is mounted on a mold-clamping apparatus 20C of an injection molding machine 100C. The injection molding machine 100C is configured in the same manner as the injection molding machine 100 described above except that it includes the mold-clamping apparatus 20C. The mold-clamping apparatus 20C is configured in the same manner as the mold-clamping apparatus 20 described above except that it includes a plurality of drivers 80 and a plurality of servo amplifiers 24. The driver 80 is a ram shaft having a hydraulic cylinder, a ball screw, and a motor. In the illustrated example, two drivers 80 are provided, four servo amplifiers 24 are provided, and one linear sensor 25 is provided. Two servo amplifiers 24 for controlling the motor driving the hydraulic cylinder and two servo amplifiers 24 for controlling the motor of the ball screw are provided.

The controller 1 of the positioning control device 10 centrally controls four servo amplifiers 24. The controller 1 controls four servo amplifiers 24 individually or in conjunction with each other. The controller 1 allows its switch 4 (e.g., see FIG. 2) to switch between a first control mode performing first feedback control of four servo amplifiers 24 and a second control mode disabling the first feedback control and performing second feedback control based on the second detection value of the linear sensor 25.

The positioning control device 10 of the present embodiment also achieves similar effects as in the foregoing first embodiment. In the positioning control device 10, the controller 1 centrally controls a plurality of servo amplifiers 24. Thus, even when a plurality of servo amplifiers 24 are provided, these servo amplifiers 24 can be controlled individually and in conjunction with each other. In addition to the positioning of the movable mold 22b, the posture such as inclination of the movable mold 22b can be controlled as desired. Furthermore, the controller 1 can selectively drive the hydraulic cylinder or the ball screw in the driver 80 in a switchable manner.

Although the embodiments have been described above, the present invention is not limited to the foregoing embodiments.

In the foregoing embodiments, the positioning control device 10 is mounted on the mold-clamping apparatus 20, 20B, 20C of the injection molding machine 100, 100B, 100C. However, the positioning control device 10 may be mounted on a mold-clamping apparatus for forging machines, machine presses, or die casting machines. The industrial machines to be equipped with the positioning control device 10 are not limited to mold-clamping apparatuses and may be transportation machines such as vehicles, trackless vehicles, rail guided vehicles, and stacker cranes. In this case, vehicles, carriers, carriages, etc. correspond to movable bodies.

Figure 10:
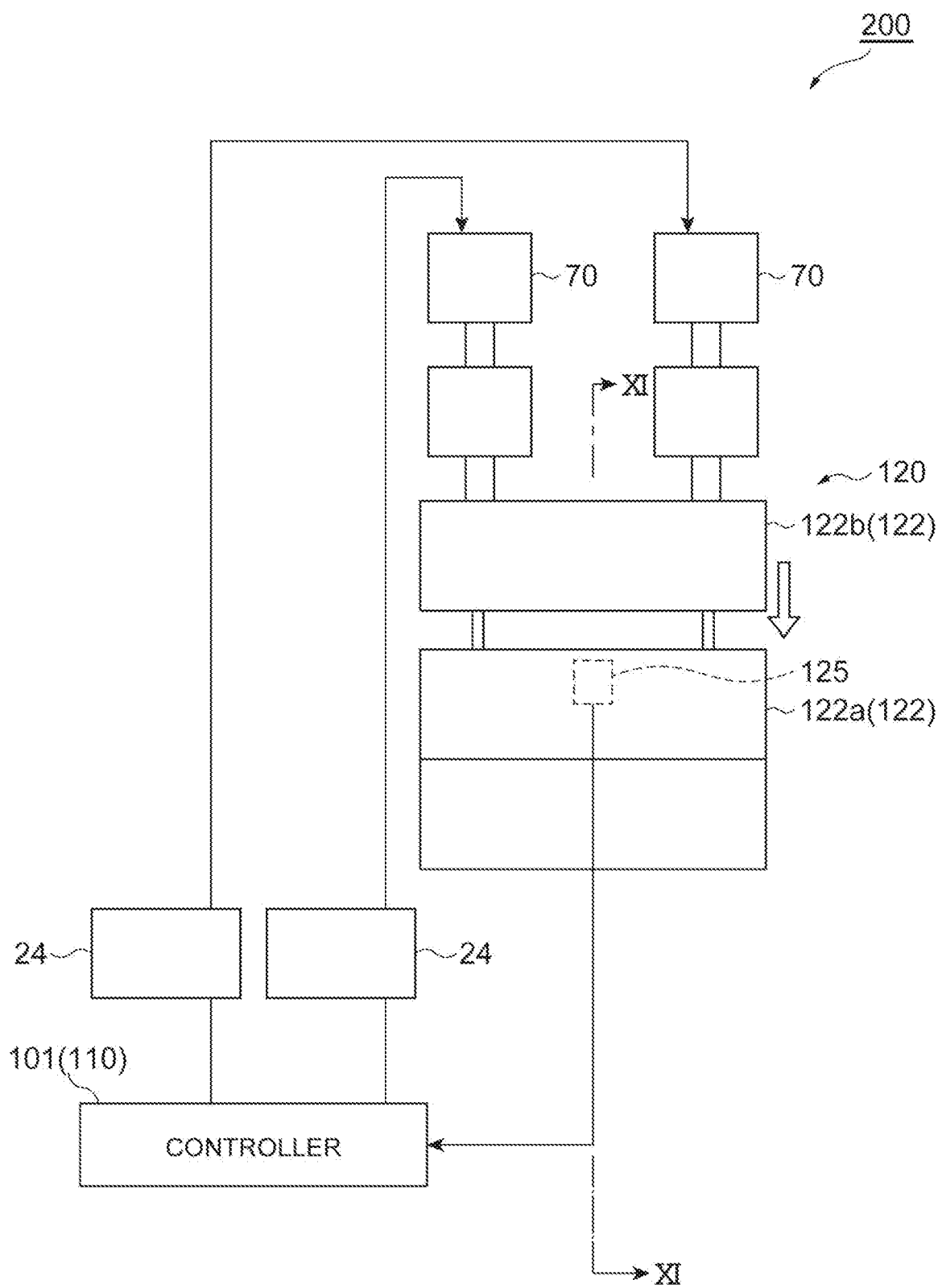
FIG. 10 is a schematic front view of a press brake including a mold-clamping apparatus equipped with a positioning control device according to a modification.
Figure 11:
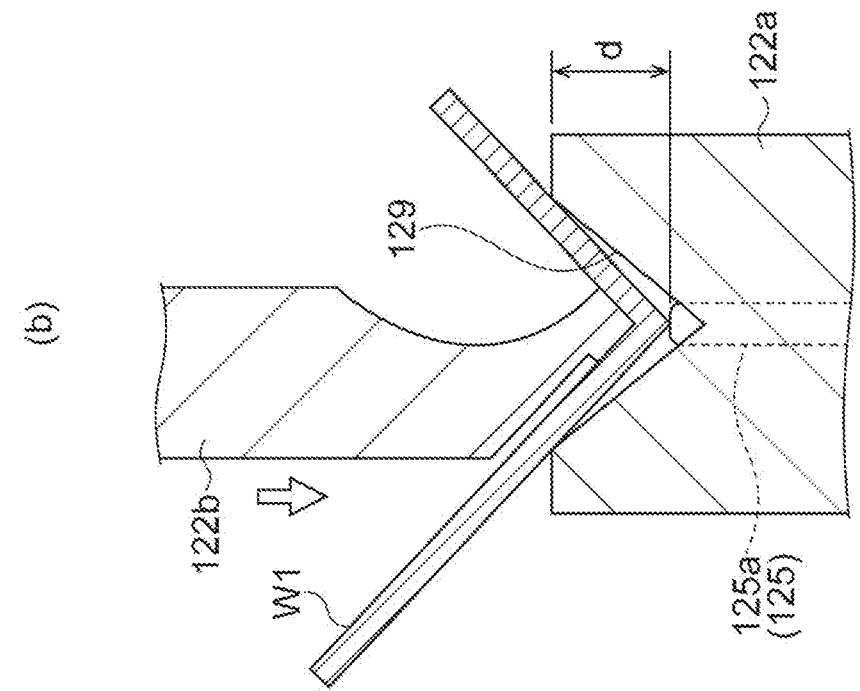
FIG. 11(a) is a schematic cross-sectional view taken along line XI-XI in FIG. 10 before pushing.
FIG. 11(b) is a schematic cross-sectional view taken along line XI-XI in FIG. 10 after pushing.
Figure 11:
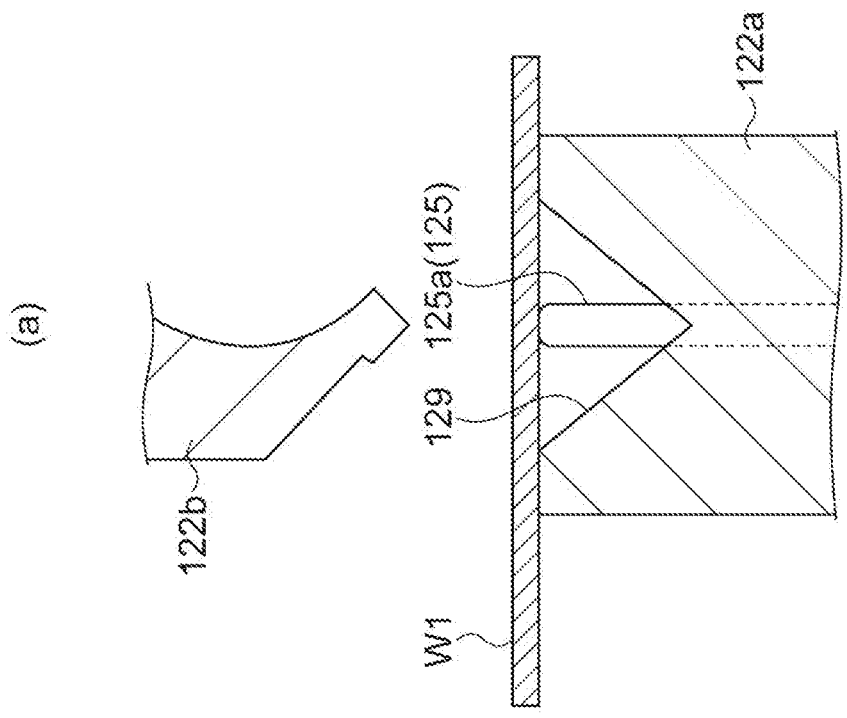
Figure 12:
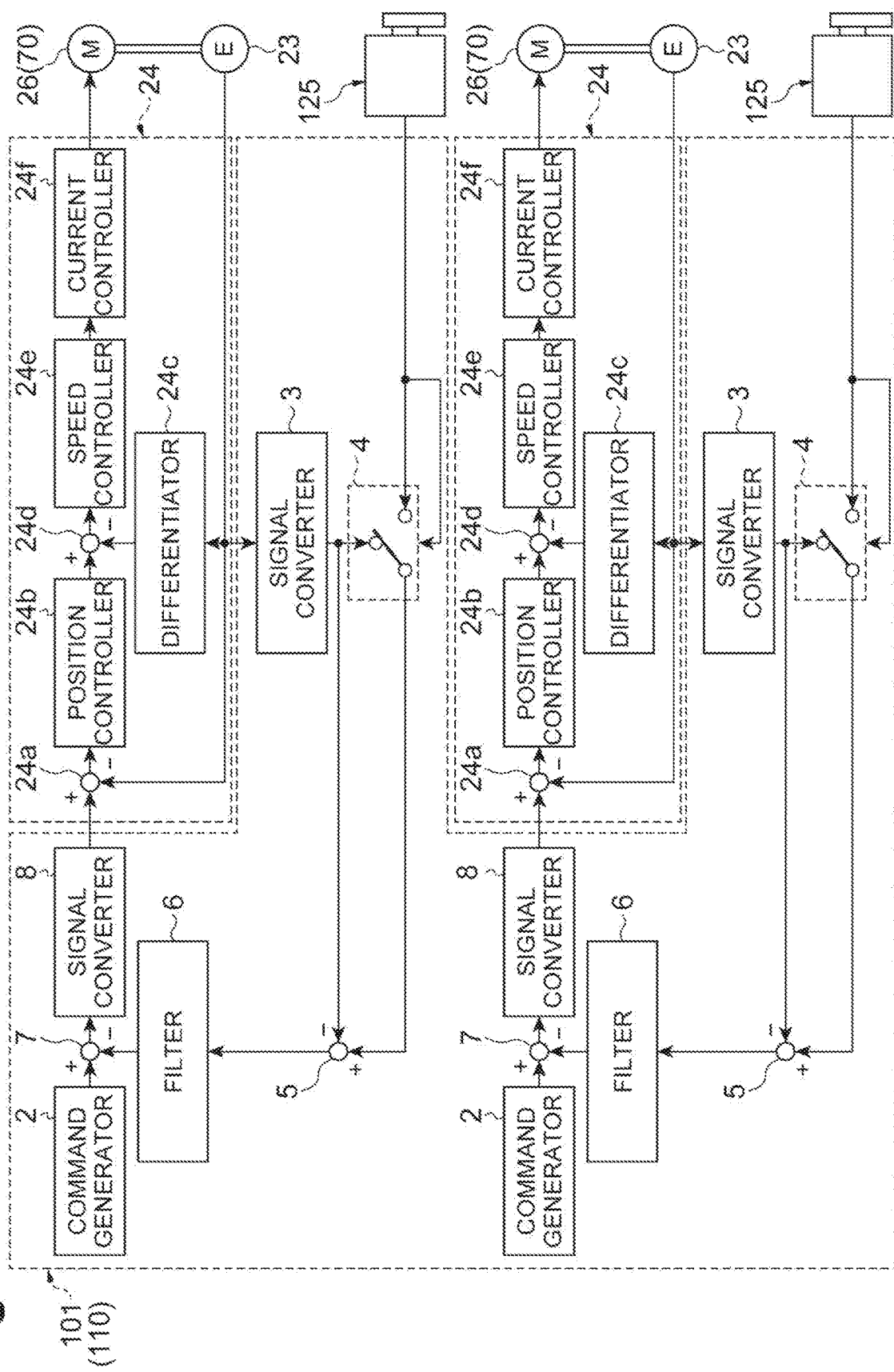
FIG. 12 is a block diagram of the controller and the servo amplifiers illustrated in FIG. 10.

FIG. 10 is a schematic front view of a press brake including a mold-clamping apparatus equipped with a positioning control device according to a modification. FIG. 11 is a schematic cross-sectional view taken along line XI-XI in FIG. 10. FIG. 12 is a block diagram of the controller and the servo amplifiers illustrated in FIG. 10. The positioning control device according to an aspect of the present invention is also applicable to, for example, a press brake 200, as illustrated in FIG. 10 and FIG. 11. The press brake 200 is used for, for example, folding a flat plate-shaped plate material W1 as a work.

The press brake 200 includes a mold-clamping apparatus 120. The mold-clamping apparatus 120 is configured in the same manner as the mold-clamping apparatus 20B described above (e.g., see FIG. 8) except that it includes a mold 122, a pair of linear sensors 125, and a positioning control device 110.

The mold 122 includes a lower die 122a that is a fixed die and an upper die 122b that is a movable die (e.g., movable body). The lower die 122*a* and the upper die 122*b* are disposed to face each other in the up-down direction. A plate material W1 is placed on the upper surface of the lower die 122*a*. A groove 129 shaped like a letter V in cross section is formed on the upper surface of the lower die 122*a*.

A pair of linear sensors 125 are disposed so as to be embedded in the lower die 122*a*. More specifically, a pair of linear sensors 125 is disposed so as to be embedded on one side and the other side in a direction along the groove 129. The linear sensors 125 are configured in the same manner as the linear sensor 25 (e.g., see FIG. 4). The linear sensor 125 is disposed such that a piston rod 125*a* forming the magnetic rod 25*a* described above (e.g., see FIG. 4) protrudes upward from the bottom of the groove 129. The piston rod 125*a* is biased upward by a biasing member such as a spring. The tip end of the piston rod 125*a* is positioned to be flush with and in contact with the plate material W1 before the flat plate-shaped plate material W1 placed on the upper surface of the lower die 122*a* is processed.

In the mold-clamping apparatus 120, as illustrated in FIG. 11(*a*) and FIG. 11(*b*), the upper die 122*b* pushes in the plate material W1 disposed on the upper surface of the lower die 122*a* toward the lower die 122*a* such that the lower portion of the upper die 122*b* enters the groove 129. Thus, the plate material W1 is folded, and the piston rod 125*a* is pushed downward with the plate material W1 interposed. The linear sensor 125 detects the amount of pushing d of the piston rod 125*a* as a measured value (e.g., second detection value).

As illustrated in FIG. 12, the positioning control device 110 includes a controller 101. The controller 101 centrally controls two servo amplifiers 24. The controller 101 includes a pair of configurations of the controller 1 described above (e.g., see FIG. 2) corresponding to two servo amplifiers 24. In other words, the controller 101 includes two controllers 1 (e.g., see FIG. 2) each controlling the corresponding servo amplifier 24.

The controller 101 allows its switches 4 to switch between a first control mode performing first feedback control of two servo amplifiers 24 and a second control mode disabling the first feedback control and performing second feedback control based on the measured values of a pair of linear sensors 25. The controller 101 performs feedback control of one driver 70 of a pair of drivers 70, based on the measured value of the linear sensor 125 embedded on one side in the direction along the groove 129. The controller 101 performs feedback control of the other driver 70 of a pair of drivers 70, based on the measured value of the linear sensor 125 embedded on the other side in the direction along the groove 129.

Here, the bending angle of the plate material W1 in folding the plate material W1 can be geometrically calculated based on the amount of pushing d (e.g., see FIG. 11) that is the measured value by the linear sensor 125 and a defined value that is the groove width of the groove 129 in the lower die 122*a*. Thus, the controller 101 determines the amount of pushing d as a target position from the specified bending angle, based on the relationship between the amount of pushing d, the groove width, and the bending angle, and generates a position command based on the determined amount of pushing d, with the command generator 2.

In the controller 101, two command generators 2 are provided individually for two servo amplifiers 24. However, a common, single command generator 2 may be provided for two servo amplifiers 24. The driver 70 is either a ball screw drive or a hydraulic drive. The tip end of the piston rod 125*a* may be positioned below the lower surface of the plate material W1 in a state before processing (e.g., home position) in which the flat plate-shaped plate material W1 is placed on the upper surface of the lower die 122*a*. Each of a pair of linear sensors 125 may optionally not be associated with one of a pair of drivers 70. For example, a single linear sensor may be shared by a pair of drivers 70 and each of a pair of drivers 70 may be feedback-controlled based on the measured value of the same linear sensor.

Figure 13:
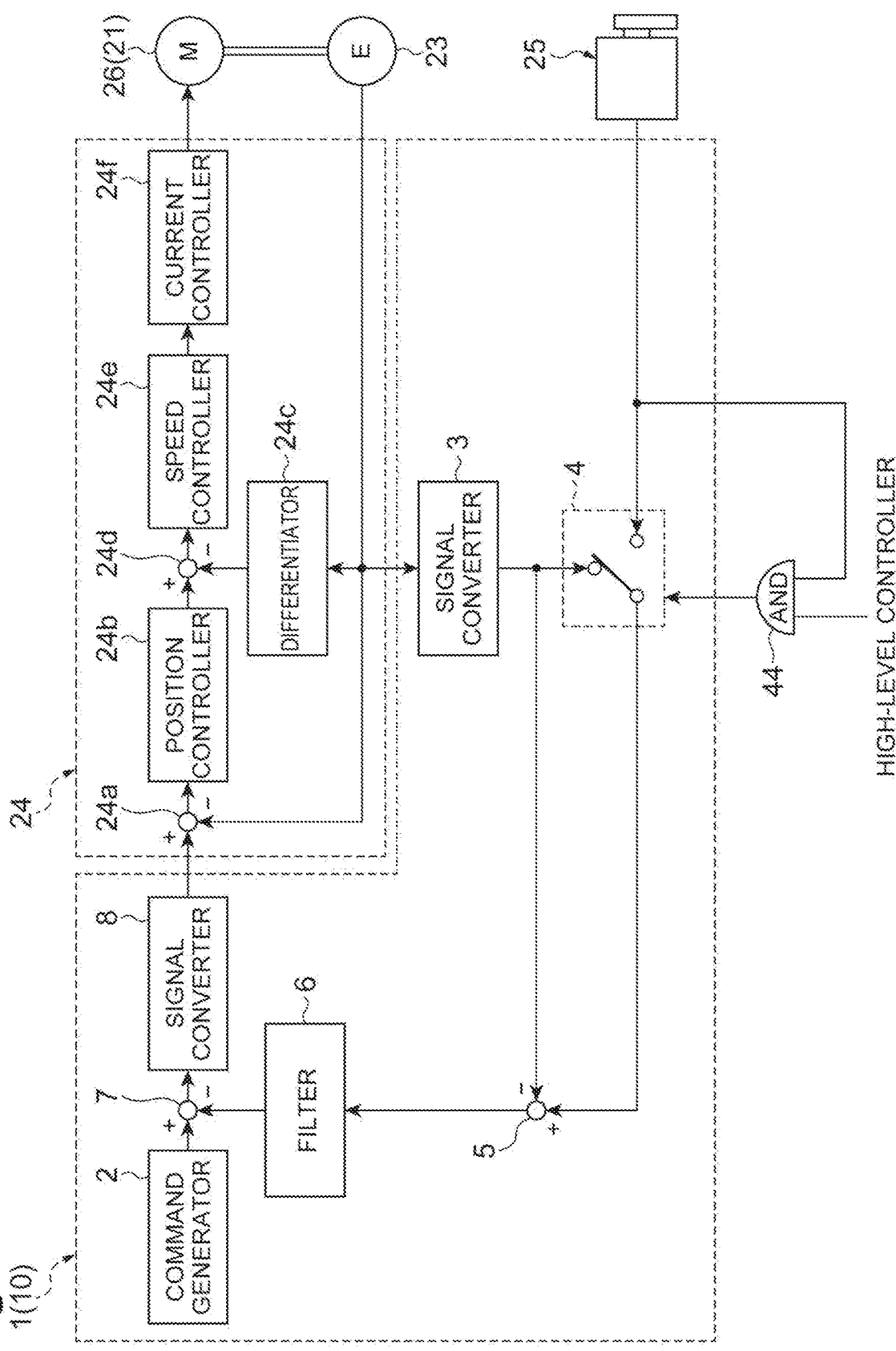
FIG. 13 is a block diagram of the controller and the servo amplifiers in another modification.

In the foregoing embodiments, the switch 4 is switched upon input of the second detection value from the linear sensor 25. However, as illustrated in FIG. 13, an AND circuit 44 may be provided, and the switch 4 may be switched with the AND condition of input of the second detection value from the linear sensor 25 and input of a request from the host controller. More specifically, when both of the second detection value and a request from the host controller are input, the switch 4 may switch the control mode to the second control mode; otherwise the switch 4 may switch the control mode to the first control mode.

In the foregoing embodiments, the fixed mold 22*a* and the movable mold 22*b* are disposed to face each other in the vertical direction (e.g., direction Z), and the movable mold 22*b* is movable in the vertical direction. However, the fixed mold 22*a* and the movable mold 22*b* may be disposed to face each other in the horizontal direction, and the movable mold 22*b* may be movable in the horizontal direction.

In the foregoing embodiments, the number of servo amplifiers 24, the number of motors 26, the number of encoders 23, and the number of linear sensors 25 are not limited and may be one or more. The number of servo amplifiers 24, the number of motors 26, the number of encoders 23, and the number of linear sensors 25 may be different from each other. At least some of the number of servo amplifiers 24, the number of motors 26, the number of encoders 23, and the number of linear sensors 25 may be equal to each other. The number of servo amplifiers 24 may be greater than the number of linear sensors 25 or may be equal to or greater than the number of linear sensors 25. The number of servo amplifiers 24 may be less than the number of linear sensors 25 or may be equal to or less than the number of linear sensors 25.

In the foregoing embodiments, the encoder 23 detects the position of the movable body based on the amount of driving of the motor 26. However, the amount of driving based on which the position of the movable body is detected may optionally not be the amount of driving of the motor 26. The amount of driving of any one of the driving elements (such as ball screw and gear) other than the motor 26 in the driver 21 may be detected to detect the position of the movable body. In the foregoing embodiments, the encoder 23 is used as the first detector. However, the first detector is not limited, and may be any other sensors, devices, or instruments that detect the position of the movable body based on the amount of driving of the driver 21, 70, 80. In the foregoing embodiments, the linear sensor 25 is used as the second detector. However, the second detector is not limited and may be any other sensors, devices, or instruments such as load sensor. In the foregoing embodiments, the controller 1 may not have the filter 6.

In the foregoing embodiments, the injection molding machine 100 (e.g., industrial machine) includes the NC device 60. However, the injection molding machine 100 (e.g., industrial machine) may include, for example, a control device such as a programmable logic controller (PLC), instead of the NC device 60. In the foregoing embodiments, the controller 1 includes the command generator 2. However, the control device such as the NC device 60 or a PLC may include the command generator 2. The controller 1 may be configured with software based on a hardware configuration including a processor, a read only memory (ROM), and a random access memory (RAM) for implementing a variety of functions including the functions of the present invention or may be configured with an electric circuit or an electronic circuit including a variety of circuit elements in combination.

In the foregoing embodiments, the switch 4 is set in a state in which the control mode is switched to the first control mode when the second detection value is not input, and is set in a state in which the control mode is switched to the second control mode when the second detection value is input. However, the embodiments are not limited thereto. The switch 4 is set in a state in which the control mode is switched to the first control mode when the second detection value is a position farther from the target position than the set distance. The switch 4 is set in a state in which the control mode is switched to the second control mode when the second detection value detected by the second detector is positioned within or less than the set distance of the target position. The set distance is a value (e.g., preset). The set distance is equal to or shorter than a distance described above. The set distance is not limited to a particular value and may be set as appropriate by the operator. As described above, the linear sensor 25 is a sensor having a certain detection range and detects the position of a movable body when the movable body comes closer to the target position within a distance or shorter. Thus, the linear sensor 25 detects the second detection value when the second detection value is positioned within or close to a set distance of the target position. On the other hand, the linear sensor 25 does not detect the second detection value when the second detection value is positioned farther than the set distance from the target position. That is, whether the second detector detects the second detection value is, in other words, whether the second detection value is positioned farther than the set distance from the target position.

In the foregoing embodiments, the switch 4 may switch based on the first detection value, rather than the second detection value, as a switching condition of the control mode between the first control mode and the second control mode. In this case, the switch 4 switches the control mode based on whether the first detection value is positioned closer than the set distance.

In the foregoing embodiments, a description has been made to the case where the switch 4 switches the control mode from the first control mode to the second control mode (e.g., where the movable mold 22b moves toward the fixed mold 22a). However, the switch 4 may perform the switching at an appropriate timing in the same manner also in the case where the switch 4 switches the control mode from the second control mode to the first control mode (e.g., where the movable mold 22b recedes from the fixed mold 22a). In this case, in the mold-clamping apparatus 20, 20B, 20C, the movable mold 22b only recedes from the fixed mold 22a, and therefore the switch 4 may switch the control mode from the second control mode to the first control mode before the start or at the start of the receding operation, such that the first control mode is performed throughout the movable range of the movable mold 22b. Thus, it is not necessary to switch the control mode during moving of the movable mold 22b, thereby reducing control load and enabling prompt return to the initial position.

In the foregoing embodiments, the switch 4 has been described as the switching unit, by way of illustration. However, the switching unit is not limited thereto as long as it can substantially switch the control mode.

1, 101 . . . controller, 2 . . . command generator (command generating unit), 4 . . . switch (switching unit), 6 . . . filter (filter unit), 10, 110 . . . positioning control device, 20, 20B, 20C, 120 . . . mold-clamping apparatus (industrial machine), 21, 70, 80 . . . driver, 22, 122 . . . mold, 22a . . . fixed mold, 22b . . . movable mold (movable body), 23 . . . encoder (first detector), 24 . . . servo amplifier, 25, 125 . . . linear sensor (second detector), 26 . . . motor, 122a . . . lower die, 122b . . . upper die (movable body).

The invention claimed is:

1. A positioning control device mounted on an industrial machine comprising: a driver including a motor; a movable body movable by the driver; a first detector configured to detect a position of the movable body based on an amount of driving of the driver; a servo amplifier configured to perform first feedback control of feedback-controlling driving of the motor by subtracting a first detection value by the first detector from a received control command; and a second detector configured to detect a position of the movable body when the movable body is within a distance or less of a target position, the positioning control device configured to position the movable body at the target position and comprising a controller configured to control the servo amplifier, wherein the controller includes a switching unit configured to switch control modes between a first control mode performing the first feedback control of the servo amplifier and a second control mode in which the first feedback control of the servo amplifier is disabled by being configured with a circuit that cancels out the first detection value fed back to the servo amplifier and performing a second feedback control of feedback-controlling driving of the motor based on a second detection value by the second detector and a position command in the first control mode and a position command in the second control mode are the same, wherein the first detection value fed back to the servo amplifier is cancelled out by also adding the first detection value to the position command during the second control mode, and wherein the controller includes a command generating unit configured to generate the control command received by the servo amplifier, wherein the controller inputs, in a state in which the control mode is switched to the first control mode by the switching unit, the control command generated by the command generating unit to the servo amplifier, and the control command is the position command, and wherein the controller inputs, in a state in which the control mode is switched to the second control mode by the switching unit, the control command to the servo amplifier and the control command includes the first detection value, which has been added to the position command and the second detection value, which has been subtracted from the position command.

2. The positioning control device according to claim 1, wherein a plurality of the servo amplifiers are provided, and the controller centrally controls the servo amplifiers.

3. The positioning control device according to claim 1, wherein when the second detection value is positioned farther from the target position than a set distance, the switching unit is set in a state in which the control mode is switched to the first control mode, and when the second detection value is positioned within the set distance or less of the target position, the switching unit is set in a state in which the control mode is switched to the second control mode.

4. The positioning control device according to claim 1, wherein the controller includes a filter unit configured to filter off a high-frequency component of the second detection value to be fed back in the second feedback control.

5. The positioning control device according to claim 1, wherein in the second feedback control, driving of the motor is feedback-controlled using the second detection value as a feedback component including a detection error relative to the first detection value.

6. A mold-clamping apparatus comprising:
a driver including a motor;
a mold including a fixed mold, and a movable mold serving as a movable body movable, relative to the fixed mold, by the driver;
a first detector configured to detect a position of the movable body based on an amount of driving of the driver;
a servo amplifier configured to perform a first feedback control of feedback-controlling driving of the motor by subtracting a detection value by the first detector from a received control command;
a second detector configured to measure a position of the movable mold when the movable mold is within a distance or less of a target position; and
a positioning control device configured to position the movable body at the target position and comprising a controller configured to control the servo amplifier, wherein
the controller includes a switching unit configured to switch control modes between a first control mode performing the first feedback control of the servo amplifier and a second control mode disabling the first feedback control of the servo amplifier by being configured with a circuit that cancels out the first detection value fed back to the servo amplifier and performing a second feedback control of feedback-controlling driving of the motor based on a second detection value by the second detector and
a position command in the first control mode and a position command in the second control mode are the same,
wherein the first detection value fed back to the servo amplifier is cancelled out by also adding the first detection value to the position command during the second control mode, and
wherein the controller includes a command generating unit configured to generate a control command,
wherein the controller inputs, in a state in which the control mode is switched to the first control mode by the switching unit, the control command generated by the command generating unit to the servo amplifier, and the control command is the position command, and
wherein the controller inputs, in a state in which the control mode is switched to the second control mode by the switching unit, the control command to the servo amplifier and the control command includes the first detection value that has been added to the position command and from which the second detection value is subtracted from the position command.

7. The positioning control device according to claim 2, wherein when the second detection value is a position farther from the target position than a set distance, the switching unit is set in a state in which the control mode is switched to the first control mode, and when the second detection value is a position close to the target position within the set distance or shorter, the switching unit is set in a state in which the control mode is switched to the second control mode.

8. The positioning control device according to claim 2, wherein the controller includes a filter unit configured to filter off a high-frequency component of the second detection value to be fed back in the second feedback control.

9. The positioning control device according to claim 3, wherein the controller includes a filter unit configured to filter off a high-frequency component of the second detection value to be fed back in the second feedback control.

10. The positioning control device according to claim 3, wherein the controller
includes a command generating unit configured to generate a control command,
inputs, in a state in which the control mode is switched to the first control mode by the switching unit, the control command generated by the command generating unit to the servo amplifier, and
inputs, in a state in which the control mode is switched to the second control mode by the switching unit, the control command to which the first detection value is added and from which the second detection value is subtracted to the servo amplifier.

11. The positioning control device according to claim 4, wherein the controller
includes a command generating unit configured to generate a control command,
inputs, in a state in which the control mode is switched to the first control mode by the switching unit, the control command generated by the command generating unit to the servo amplifier, and
inputs, in a state in which the control mode is switched to the second control mode by the switching unit, the control command to which the first detection value is added and from which the second detection value is subtracted to the servo amplifier.

12. The positioning control device according to claim 2, wherein in the second feedback control, driving of the motor is feedback-controlled using the second detection value as a feedback component including a detection error relative to the first detection value.

13. The positioning control device according to claim 3, wherein in the second feedback control, driving of the motor is feedback-controlled using the second detection value as a feedback component including a detection error relative to the first detection value.

14. The positioning control device according to claim 4, wherein in the second feedback control, driving of the motor is feedback-controlled using the second detection value as a feedback component including a detection error relative to the first detection value.

15. The positioning control device according to claim 1, wherein in the second feedback control, driving of the motor is feedback-controlled using the second detection value as a feedback component including a detection error relative to the first detection value.

\* \* \* \* \*